United States Patent
Asghar et al.

(10) Patent No.: US 11,809,292 B2
(45) Date of Patent: Nov. 7, 2023

(54) ADAPTIVE APPLICATION RECOVERY

(71) Applicant: Cisco Technology, Inc., San Jose, CA (US)

(72) Inventors: Javed Asghar, Dublin, CA (US); Rajagopalan Janakiraman, Cupertino, CA (US); Raghu Rajendra Arur, New Delhi (IN)

(73) Assignee: Cisco Technology, Inc., San Jose, CA (US)

( * ) Notice: Subject to any disclaimer, the term of this patent is extended or adjusted under 35 U.S.C. 154(b) by 140 days.

(21) Appl. No.: 17/547,778

(22) Filed: Dec. 10, 2021

(65) Prior Publication Data

US 2023/0185683 A1    Jun. 15, 2023

(51) Int. Cl.
| | |
|---|---|
| *G06F 11/07* | (2006.01) |
| *G06F 11/30* | (2006.01) |
| *G06F 11/20* | (2006.01) |
| *H04L 67/00* | (2022.01) |

(52) U.S. Cl.
CPC ........ *G06F 11/203* (2013.01); *G06F 11/3051* (2013.01); *H04L 67/34* (2013.01)

(58) Field of Classification Search
CPC ..... G06F 11/203; G06F 11/3051; H04L 67/34
See application file for complete search history.

(56) References Cited

U.S. PATENT DOCUMENTS

| | | | |
|---|---|---|---|
| 2015/0039930 A1 | 2/2015 | Babashetty et al. | |
| 2017/0034318 A1 | 2/2017 | Gong et al. | |
| 2019/0258549 A1 | 8/2019 | Abdul Kadar et al. | |
| 2021/0342237 A1* | 11/2021 | Polimera | G06F 9/45558 |

FOREIGN PATENT DOCUMENTS

| | | | |
|---|---|---|---|
| CN | 107995043 | 5/2018 | |
| CN | 111741135 | 10/2020 | |
| EP | 3591530 A1 * | 1/2020 | G06F 11/1461 |

* cited by examiner

*Primary Examiner* — Matthew M Kim
*Assistant Examiner* — Kyle Emanuele
(74) *Attorney, Agent, or Firm* — Lee & Hayes, P.C.

(57) ABSTRACT

This disclosure describes techniques for adaptive disaster recovery of applications running on network devices. The techniques include generating an application template and an application template clone that include application attributes usable to deploy an application stack at an application site. The techniques also include sending the application template clone to a disaster recovery site group to await deployment instructions. In some examples, an observer may determine that a health metric of the application site indicates that a disaster recovery process be triggered. A disaster recovery site of the disaster recovery site group may be selected based at least in part on a performance metric. The application stack may be deployed at the disaster recovery site utilizing the application template clone.

20 Claims, 6 Drawing Sheets

ADAPTIVE APPLICATION RECOVERY

TECHNICAL FIELD

The present disclosure relates to recovery of applications running on network devices, such as applications running at data centers associated with cloud computing services.

BACKGROUND

In network environments, techniques may be used to back up an application running on a particular device in case the device exhibits poor performance. For example, disaster recovery techniques may include maintaining a back up of the application at another device. In cloud-based environments, an edge data center (DC) may be running an application. In an instance where a performance degradation occurs at the edge data center, the application operation may be moved to another site. In general, disaster recovery solutions include pre-provisioning a standby application stack at a disaster recovery site in the cloud. Such disaster recovery solutions require 1:1 redundancy of the application at a disaster recovery site, as well as a reservation of computing resources for the application at the disaster recovery site. However, reserving computing resources indefinitely is inefficient and costly.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1:
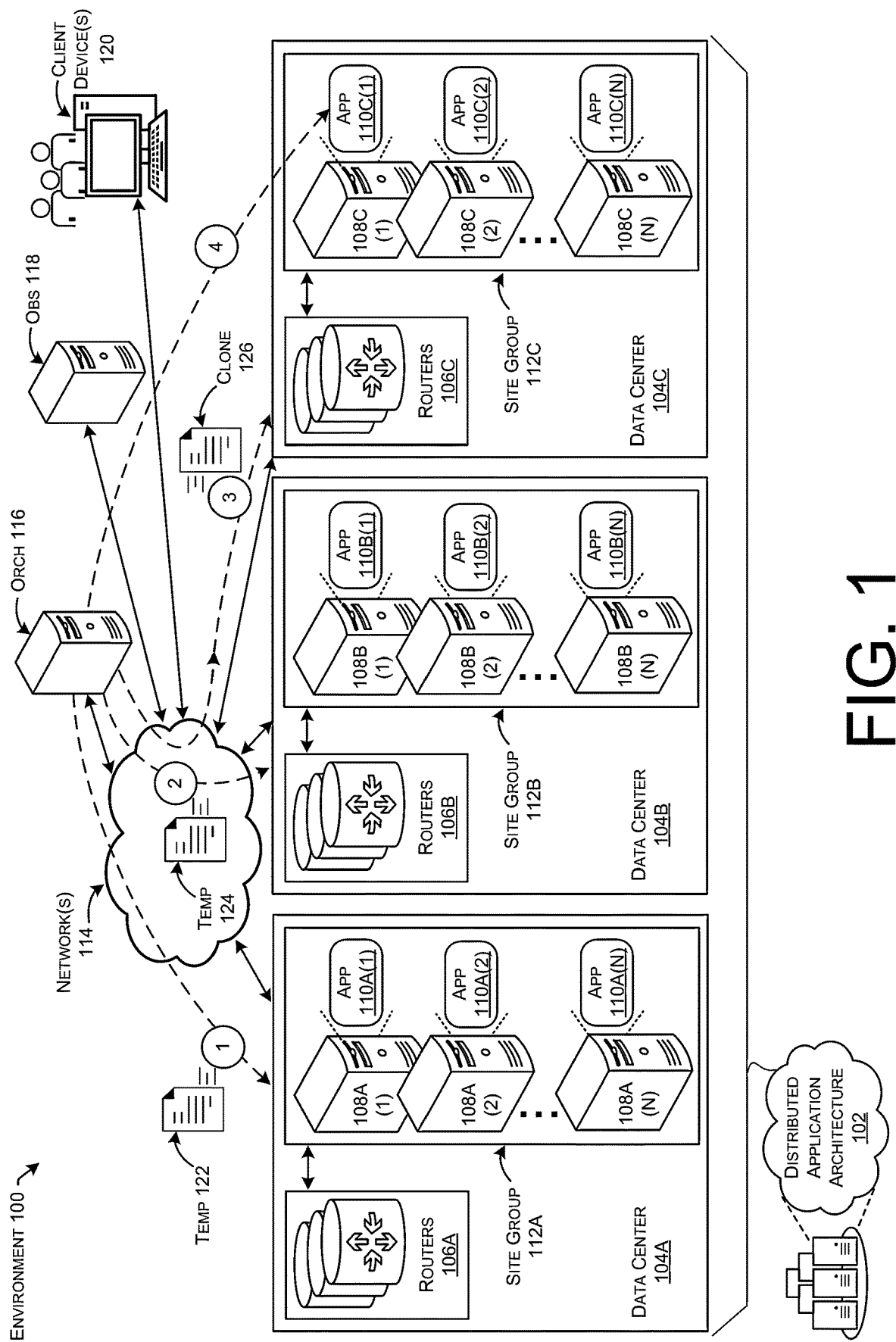
FIGS. 1 and 2 illustrate component diagrams with an example environment in which adaptive application recovery methods may be employed as part of communications between network devices, in accordance with the present concepts.

This disclosure describes, at least partly, a method that may be implemented by a disaster recovery (DR) system communicatively coupled to one or more site groups. The method may include sending an application template to an application site group. In some examples, the application template may represent application attributes that are usable to deploy an application stack at an application site of the application site group. The method may also include causing the application stack to be deployed at the application site. Further, the method may include generating an application template clone of the application template. The application template clone may be sent to one or more disaster recovery sites. The method may include monitoring a health metric associated with the application site running the application stack. In some instances, the method may include determining that the health metric violates a threshold health metric indicative of the application stack failing. Using a performance metric associated with the one or more disaster recovery sites, the method may include selecting a particular disaster recovery site for deployment of the application stack. The method may further include causing the particular disaster recovery site to deploy the application stack using the application template clone.

This disclosure also describes, at least partly, a method that may be implemented by a DR system communicatively coupled to one or more site groups. The method may include generating an application template. In some examples, the application template may represent application attributes that are usable to deploy an application stack at an application site. The method may also include causing the application stack to be deployed at the application site utilizing the application template. The method may also include generating an application template clone of the application template, and sending the application template clone to multiple disaster recovery sites. The multiple disaster recovery sites may be located in one or more different site groups than the application site, for instance. In response to a predicted failure of the application stack at the application site, the method may include ranking individual disaster recovery sites of the multiple disaster recovery sites. In some examples, the ranking may be based at least in part on a performance metric. Based at least in part on the ranking, the method may include selecting a particular individual disaster recovery site. The method may further include causing the particular individual disaster recovery site to deploy the application stack using the application template clone.

Additionally, the techniques described herein may be performed by a system and/or device having non-transitory computer-readable media storing computer-executable instructions that, when executed by one or more processors, performs the method described above.

Example Embodiments

This disclosure describes techniques for adaptive application recovery in a network. For example, the health of applications running in a network may be monitored. When the health of an application at a data center is determined and/or predicted to underperform, a disaster recovery (DR) site may be selected. Adaptive application recovery techniques may include methods to rapidly deploy an application to the selected DR site. As such, operations related to the application may continue smoothly from the perspective of a client, but without pre-provisioning of a standby application at a DR site. Thus, adaptive application recovery techniques may help prevent inefficient or wasteful consumption of computing resources. Adaptive application recovery techniques may also include methods for improving the selection of the DR site. For instance, since the application may be deployed as needed to a DR site, rather than pre-provisioned, the site selection may be based on current network and/or device conditions. As such, adaptive application recovery techniques may offer improved DR site selection, further improving the efficiency of DR for applications.

For purposes of explanation, adaptive application recovery techniques may be described herein with reference to scenarios involving sites arranged in site groups. An individual site may be a data center (DC), such as an edge DC, cloud DC, etc. A site group may be viewed as an administrative domain: a single, logical grouping of edge DCs, for instance. A site group arrangement may be used to facilitate software-defined networking (SDN), in some cases. A site group may be on-premise, cloud-based, and/or part of a multi-cloud environment. Some site groups may be associated with an actively running application, while other site groups may be available for DR purposes. In some examples, potentially all sites within a site group may have connectivity and/or policy stretch scope across sites. For instance, a site group may include full-mesh overlay connectivity. However, a site group may be an isolated fault domain with respect to another site group. For instance, each site group may be fully isolated from other site groups, without connectivity or policy stretch across site groups. Note that adaptive application recovery techniques are also contemplated for scenarios that do not involve site groups and/or involve other arrangements of sites.

Adaptive application recovery techniques may include generation and/or use of an application template. The application template may include such attributes as an application structure, application data, relevant internet protocol (IP) addressing, domain name server (DNS) entries, and/or other attributes related to any given application. An orchestrator (e.g., controller) using application-centric infrastructure (ACI) may be responsible for generation of the application template, in some examples. The application template may be sent to a site group for implementation of an application. For instance, an application template may be sent by the orchestrator to the SDN controller for a site within a site group. The SDN controller may then render the application in an individual site(s) within on-premise fabric or cloud fabric.

In some implementations, the application template may be cloned for DR purposes. The application template clone may allow the application to run at a different site, such as a DR site. For instance, the application template clone may be similar to or even identical to the original application template with respect to application structure, application data, relevant internet protocol (IP) addressing, domain name server (DNS) entries, and/or other attributes. The orchestrator may send the application template clone to a DR site group. The DR site group may be on-premise or cloud-based, and may be separate from the site group running the original application template. However, the application template clone may only be staged at a DR site and/or in the DR site group. Stated another way, the application template clone may not yet be deployed or pre-provisioned, such that resources or capacity are not being consumed. The site may then wait for a trigger to implement the application using the application template clone. For instance, the site may receive an application programming interface (API) call to trigger deployment of the application template clone in the event of a health degradation of the originally running application. Use of an application template clone may allow the application to be up and running at a DR site relatively fast, to lessen any impact to a client experience. Note that adaptive application recovery techniques may also include returning the application to operation at the original active site, again using the application template, after any problem at the site is resolved.

It is to be appreciated that a "disaster" and/or disaster recovery may refer to a variety of performance degradation scenarios. Disaster recovery may not necessarily imply a software or hardware failure and/or interruption in service provided to a client. In some examples, performance degradation may be directly observed, such as performance degrading below a threshold delineated in a service contract. In other examples, potential performance degradation may be predicted as likely to occur for a given application. Performance degradation may refer to an actual interruption in service observable by a client, or simply an unwanted drop in efficiency on the side of a service provider. In general, adaptive application recovery techniques may be employed for a wide range of types of performance degradation scenarios and/or levels of degradation severity. The examples of performance degradation provided herein are not meant to be limiting.

To summarize, a more efficient technique for responding to performance degradation includes adaptive, potentially just-in-time selection of a DR site and deployment of an application template clone at the DR site. Thus, network resources are not unnecessarily wasted by reserving them for a unknown potential performance degradation event. Selection of a DR site may be improved by basing the selection on current conditions, potentially improving network operations.

Although the examples described herein may refer to an orchestrator as the point of origin of an application template, the techniques can generally be applied to any device in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 2:
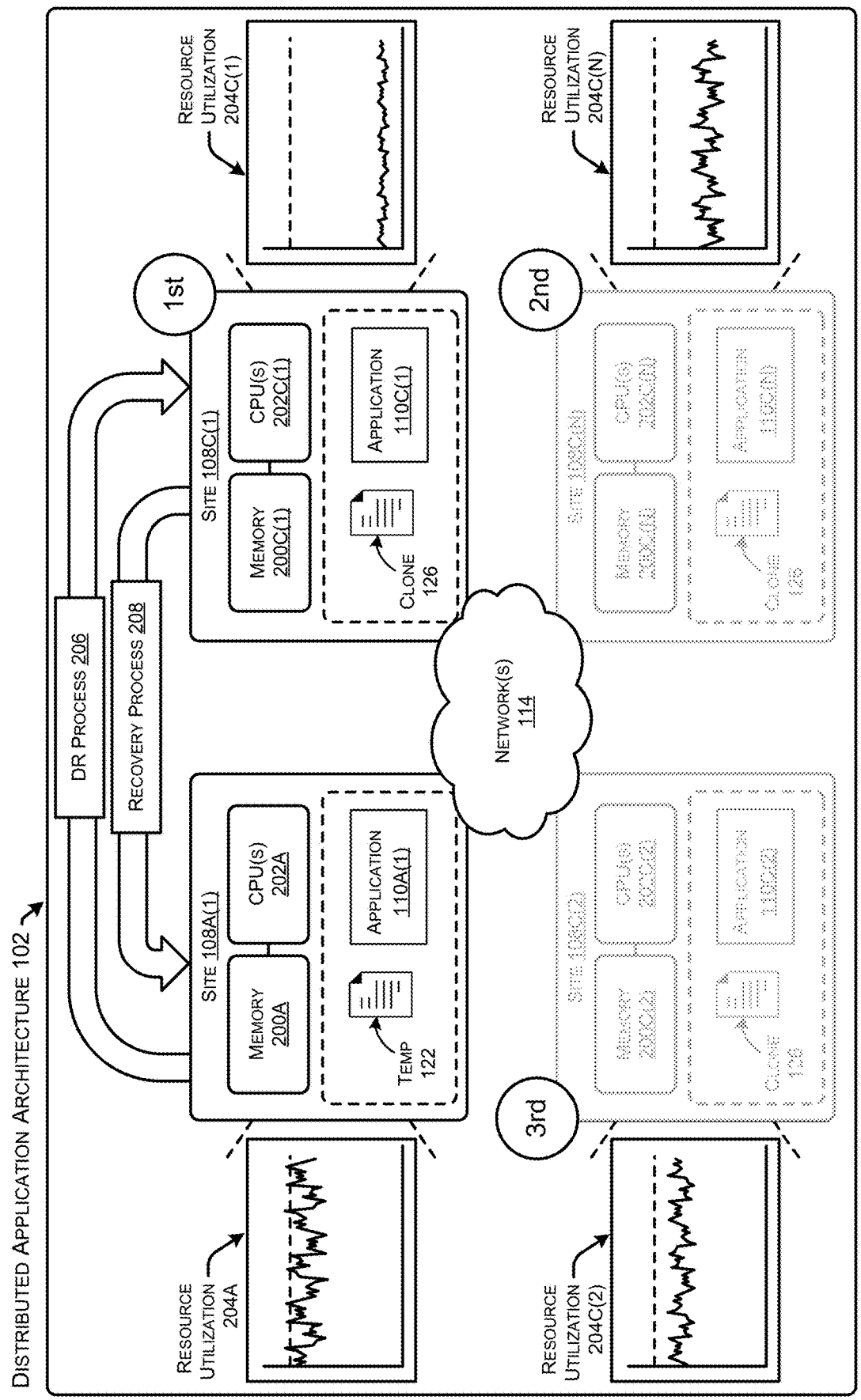

FIGS. 1 and 2 collectively illustrate an example environment 100 in accordance with the present adaptive application recovery concepts. As shown in FIG. 1, example environment 100 may feature an example distributed application architecture 102. In general, a distributed application architecture may support a multipath transport protocol, such as MultiPath Transmission Control Protocol (MPTCP), for clients that attempt open multiple subflows with an application server, for instance. Example environment 100 may also include one or more data centers 104. A data center 104 may include one or more routers 106 and one or more sites 108 (e.g., on-premise sites, cloud sites, multi-cloud sites). A site 108 may run an application 110. Furthermore, the sites 108 of a data center 104 may be viewed as belonging to a site group 112. Site groups 112 may be viewed as administrative domains and/or logical groupings of sites 108, for instance. In some examples, sites 108 may be assigned a label and/or may be grouped into site groups 112 based on unique labels. In some examples, a site group 112 may only contain a single site 108 (e.g., isolated site), but may feature a site group framework and/or other site group concepts for configuration and/or operational purposes. Example environment 100 may also include a one or more network(s) 114, an orchestrator 116, an observer 118, and client devices 120. In some implementations, the orchestrator 116 and observer 118 may be viewed as functions performed by one or more controller-type computing devices. Additionally or alternatively, the orchestrator 116 and observer 118 may be viewed as belonging to a DR system.

In some cases, parentheticals and/or letters are utilized after a reference number to distinguish like elements. Use of the reference number without the associated parenthetical is generic to the element. For instance, FIG. 1 depicts three data centers 104, including data center 104A, data center 104B, and data center 104C. Within data center 104A, site 108A(2) is running application 110A(2). Also, site group 112B of data center 104B includes sites 108B, including site 108B(1), 108B(2), and 108B(N), where the "N" indicates that potentially any number of sites 108B may be included in site group 112B of data center 104B. Stated another way, N is 3 in this example, but may be any integer.

Generally, the distributed application architecture 102 of FIG. 1 may include devices housed or located in one or more data centers 104 that may be located at different physical locations. For instance, the distributed application architecture 102 may be supported by networks of devices in a public cloud computing platform, a private/enterprise computing platform, and/or any combination thereof. The one or more data centers 104 may be physical facilities or buildings located across geographic areas that designated to store networked devices that are part of the distributed application architecture 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the distributed application architecture 102 may not be located in explicitly defined data centers 104, but may be located in other locations or buildings.

The distributed application architecture 102 may be accessible to client devices 120 over one or more networks 114, such as the Internet. The distributed application architecture 102 and the one or more networks 114 may each respectively include one or more networks implemented by any viable communication technology, such as wired and/or wireless modalities and/or technologies. The distributed application architecture 102 and networks 114 may each include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.), Wide Area Networks (WANs)— both centralized and/or distributed—and/or any combination, permutation, and/or aggregation thereof. The distributed application architecture 102 may include devices, virtual resources, and/or other nodes that relay packets from one network segment to another by nodes in the computer network.

Within the example environment 100, the data centers 104, routers 106, site groups 112 (and/or sites 108), orchestrator 116, observer 118, client devices 120, and/or other devices may exchange communications (e.g., packets) via a network connection(s), some of which are indicated by double arrows. For instance, network connections may be transport control protocol (TCP) network connections or any network connection (e.g., information-centric networking (ICN)) that enables the sites 108 to exchange packets with other devices, such as a router 106. The network connections represent data paths between devices, such as between a site 108 and orchestrator 116, or a client device 120. It should be appreciated that the term "network connection" may also be referred to as a "network path." The suggestion of a cloud computing network in the example in FIG. 1 is not meant to be limiting. Other types of networks are contemplated in accordance with adaptive application recovery concepts.

In some examples, the distributed application architecture 102 may provide, host, or otherwise support one or more application services for client devices 120 to connect to and use. The client devices 120 may comprise any type of device configured to communicate using various communication protocols (e.g., MCTCP, QUIC, and/or any other protocol) over the networks 114. For instance, a client device 120 may comprise a personal user device (e.g., desktop computers, laptop computers, phones, tablets, wearable devices, entertainment devices such as televisions, etc.), network devices (e.g., servers, routers, switches, access points, etc.), and/or any other type of computing device.

The application services may be distributed applications such that a site group 112 may be configured to scale up or down to support instances of an application 110 to service client requests based on demand from the client devices 120. In some examples, the physical sites 108 may each have their own physical IP (PIP) address through which they are reachable, but a client device 120 need only know the virtual IP (VIP) address for the application service as a whole in order to access an instance of an application 110 hosted on a site 108. In this way, client devices 120 need only know a single VIP to access an application service, and the request to use the application service will be routed to one of the hosted applications 110 on one of the sites 108.

FIGS. 1 and 2 may be associated with an example scenario in which site group 112A and site group 112B are actively running an application 110, while site group 112C may be available for DR purposes. Furthermore, site group 112A may be located in New York State, site group 112B may be located in New Jersey State, and site group 112C may be located in Denver, Colo. Site group 112A and site group 112B may feature multiple on-premise fabrics for actively running application 110. Site group 112C may be feature a cloud site for responding to a DR event. The location or other specific details of site groups 112 are intended for the purpose of illustration of the scenario, and are not meant to be limiting.

In accordance with this example scenario, FIG. 1 shows several examples of communications between various devices of example environment 100. The communications are indicated with dashed, numbered lines. For example, at "Step 1," orchestrator 116 may generate and send an application template 122 to data center 104A via network 114. Application template 122 may include application attributes related to application 110 and/or to a relevant network, such as an application structure, application data, network configuration, relevant internet protocol (IP) addressing, domain name server (DNS) entries, and/or other attributes. Furthermore, the application template 122 may be scoped specifically for the site group 112A. Application template 122 may be received at site group 112A for implementation of application 110A(1), application 110A(2), and/or application 110A(N). For instance, application template 122 may be sent by orchestrator 116 to an SDN controller for site 108A(1) within site group 112A. The SDN controller for site 108A(1) may then render application 110A(1) at site 108A(1) within on-premise fabric (or cloud fabric), using at least some of the information from application template 122. Stated another way, application 110A(1) may represent an application stack deployed at site 108A(1).

At "Step 2" of FIG. 1, orchestrator 116 may generate and send an application template 124 to data center 104B via network 114. In some examples, application template 124 may be similar to or potentially identical to application template 122. Application template 124 may be scoped specifically for site group 112B. Application template 124 may be received at site group 112B for implementation of application 110B(1), application 110B(2), and/or application 110B(N). In this manner, application 110 may be running in multiple data centers 104A as part of the distributed application architecture 102.

At "Step 3" of FIG. 1, orchestrator 116 may generate and send an application template clone 126 to data center 104C via network 114. Application template clone 126 may be similar to or potentially identical to application template 122 and/or application template 124. In some examples, application template clone 126 may be received at site group 112C, but only staged to sites 108C, and not deployed or pre-provisioned. As such, potentially no resources or capacity may be actively consumed at sites 108C. Application template clone 126 may be staged at site group 112C to be ready for implementation of a DR process, such as implementing application 110C(1), application 110C(2), and/or application 110C(N). Additionally, site group 112C may be designated as a DR site group. As a DR site group, site group 112C may be functionally and/or physically isolated from active application site groups, such as site group 112A and/or site group 112B.

Note that in some examples, application template 124 may also be viewed as a "clone" of application template 122. However, as used herein, "application template clone" will be used to refer to a copy of an application template that is being sent to a DR site/site group for DR purposes. Hence application template clone 126 is sent to the DR site group 112C for implementing a DR process. Furthermore, another application template clone of application template 122 (or 124) may be sent to additional DR sites or DR site groups to await DR process instructions and deployment (not shown).

In the example scenario of FIG. 1, site group 112A and/or site group 112B may proceed with actively running application 110. Meanwhile, observer 118 may monitor the performance, operation, key performance indicator(s) (KPIs), ability to meet a service level agreement (SLA), and/or other aspects of application 110. Observer 118 may also monitor health and/or other metrics related to sites 108 and/or site groups 112.

At "Step 4" of FIG. 1, observer 118 may decide, based on the monitoring, that a DR process is warranted. For instance, the monitoring may suggest that application 110 should be migrated to a DR site to avoid degradation of service. In an instance where the observer 118 decides a DR process is warranted, the observer 118 may trigger deployment of application template clone 126 to run application 110C(1) at site 108C(1). Observer 118 may send instructions to orchestrator 116 to trigger deployment of application template clone 126, for example. In some implementations, observer 118 may also assist with a selection of a DR site and/or DR site group at which to deploy the DR process. Site selection of a DR site, or DR site group, will be described in more detail relative to FIG. 2, below.

FIG. 2 provides further detail regarding the example scenario introduced relative to FIG. 1, above. FIG. 2 includes some elements of the distributed application architecture 102, including site 108A(1), site 108C(1), site 108C(2), and site 108C(N). As depicted in FIG. 2, any of the sites 108 may be communicatively connected via the one or more network(s) 114, introduced and described above. Some aspects of the example shown in FIG. 2 may be similar to aspects of the example described above relative to FIG. 1. Therefore, for sake of brevity, not all elements of FIG. 2 will be described in detail.

As introduced above, FIGS. 1 and 2 may be associated with an example scenario in which site group 112A and site group 112B are actively running an application 110, while site group 112C may be available for DR purposes. FIG. 2 provides further detail regarding conditions at site 108A(1), site 108C(1), site 108C(2), and site 108C(N), and how the conditions may help determine a DR process is warranted and/or help with DR site selection, for instance. As shown in FIG. 2, any of sites 108 may include components such as memory 200, CPU(s) 202 and/or other components that support the use of an application template or template clone to deploy and/or run an application at the site. Note that application template 122 is available at site 108A, while application template clone 126 is available at each of sites 108C(1), 108C(2), and 108C(N). Although FIG. 2 depicts sites 108 that include a CPU and memory, the depiction of these particular elements is not meant to be limiting. A variety of computing resources are contemplated for sites 108 and described above and below.

In the scenario depicted in FIG. 2, observer 118 (FIG. 1) may review a metric (e.g., health metric) to determine whether a DR process is warranted. Example metrics may include resource utilization, capacity usage, external access, latency, etc. Observer 118 may monitor the metric of the sites 108 and determine values over a period of time. For example, observer 118 may monitor resource utilization characteristics and determine resource utilization values over a period of time, depicted as resource utilization 204 (e.g., a resource utilization graph) in FIG. 2. For example, resource utilization 204A corresponds to site 108A(1), and depicts resource utilization values of site 108A(1). Furthermore, observer 118 may be constantly monitoring the health, capacity, KPI, SLA, and/or other metric(s) of application 110A(1) at runtime. Additionally, observer 118 may maintain a health history, such as a record of capacity usage patterns, with respect to application 110A(1) and/or site 108A(1).

Resource utilization 204A suggests that resource utilization values of site 108A(1) are occasionally exceeding a predetermined threshold value (depicted as a dashed horizontal line) by rising above the dashed line on the graph. The predetermined threshold value may relate to an expected KPI of the service provided by application 110, for instance. Resource utilization 204A may be viewed as a measure of the health of site 108A(1). Resource utilization values exceeding a predetermined threshold value at least once may represent a degradation of the health of site 108A(1).

Observer 118 may determine that resource utilization values of site 108A(1) have exceeded the threshold value at least once, and may determine to trigger DR process 206. However, resource utilization values exceeding a threshold is merely one example of an event that may trigger a DR process. A wide variety of observations are contemplated for triggering the DR process 206. Stated another way, observer 118 may observe, by any of a variety of measures, that the health of an instance of application 110 has degraded compared to a user-intended KPI.

When observer 118 determines that the health of application 110 has degraded, observer 118 may automatically determine a site 108 and/or site group 112 for the DR process 206 to deploy a backup instance of the application 110. As shown in FIG. 2, the DR sites 108C may be ranked (e.g., "1st," "2nd," "3rd") based on their resource utilization 204. The DR site 108C ranked the highest (e.g., 1st) has the lowest values of resource utilization 204C(1), and thus the highest availability of resources. Accordingly, observer 118 may determine that DR process 206 should include migrating application 110 from site 108A(1) to site 108C(1). Site 108C(2) and site 108C(N) are shown in shadow to indicate those sites are not selected for the migration of application 110, in this example.

In general, the ranking of DR sites 108C or other techniques for site selection may be based on a wide variety of parameters and/or metrics. Some examples include a performance metric, historic capacity usage pattern, external access pattern, a traffic profile of a site(s), bandwidth, latency between sites, etc. In general, ranking of DR sites and/or DR site selection may consider which DR site would be relatively better than other DR sites for a given application or network, including consideration of the capacity needs of the application and/or the network attributes for the application traffic. In further examples, potentially optimal, dynamic DR site selection may be based on an application dependency graph, user access pattern (flow telemetry), location-awareness and/or capacity derived from flow analytics, hardware and bandwidth usage from control-plane telemetry, a cost factor, etc. Any of the above-mentioned parameters may be considered for DR site ranking and/or selection, while also not violating application constraints, for instance.

Depending on the location of clients of the application and/or latency needs from data collected by the observer 118, a selected DR site may or may not be geographically close to the current application location. For example, in the example scenario of FIG. 2, the DR site group 112C is located in Denver, Colo., while site group 112A is located in New York State. Thus adaptive application recovery concepts may allow for maintaining available DR sites in fewer physical locations than the active sites.

Observer 118 may trigger DR process 206 by communicating with orchestrator 116. For example, observer 118 may send an API call to orchestrator 116 to trigger the DR process 206 on-demand. Orchestrator 116 may provision and/or otherwise deploy application template clone 126. For instance, application template clone may be stored in memory 200C(1) of site 108C(1), and not active until provisioned and/or otherwise deployed.

In some examples, DR process 206 may comprise an incremental application and/or network-level DR process instead of a site-level DR process. Such an incremental or tiered scope may allow for multiple DR sites with different capacities. An incremental scope may also allow for relatively easy expansion of adaptive application recovery concepts in a cloud or multi-cloud environment. Furthermore, adaptive application recovery concepts may be viewed as featuring a generic model that defines application configuration and/or operational SLAs in a cohesive fashion. The generic model may allow grouping of applications into different hierarchies. For instance, applications may be grouped into tiers such as a single application, applications in a certain DC POD or site, applications grouped in a Network (VRF), etc. Any of the hierarchies may be a candidate for a DR process. Stated another way, adaptive application recovery concepts may be used to recover an application tier or an entire application or an entire POD of applications, or a network (e.g., pre-production, production, etc.). In some examples, the templatized application or network configuration is organized to enable deployment of any of the example groupings suggested above. The granularity or scope of the DR process (e.g., application, network, POD, etc.) may be determined dynamically through real-time monitoring of operational parameters, by observer 118 for instance. The application template or configuration template may be adjusted to that granularity. As such, adaptive application recovery techniques may be used to accomplish recovery at any granularity, depending on observed run-time characteristics.

Adaptive application recovery concepts may also include processes for reinstating an application 110 at an active application site 108. For instance, as shown in FIG. 2, recovery process 208 may include migrating application 110C(1) at DR site 108C(1) back to active status as actively running application 110A(1) at site 108A(1). Observer 118 may continue to monitor the health of site 108A(1), even after DR process 206 has migrated application 110 away from site 108A(1), for instance. In an instance where observer 118 detects that the health, capacity, KPIs, and/or ability to meet an SLA of site 108A(1) (and/or site group 112A) appear to be able to effectively run application 110A(1), observer 118 may automatically contact (e.g., make an API call to) orchestrator 116. Observer 118 may communicate that orchestrator 116 may re-deploy application 108A(1). Observer 118 may then begin baselining the health of application 108A(1) running on site 108A(1). Note that application 108C(1) may still be running on DR site 108C(1) at this point.

Once application 108A(1) baselining is complete and the health is verified by the observer 118 to be above requirements for acceptable performance of application 108A(1), observer 118 may communicate to orchestrator 116 to activate application 108A(1). Thus relevant traffic may be directed to site group 112A. Observer 118 may also communicate to orchestrator 116 to un-deploy application 108C(1) from the DR site group 112C. In some examples, recovery process 208 may be similar to a hot-standby cutover process. Thus, application template clone 126 at site group 112C may once again be undeployed and therefore not actively consuming computing resources.

To summarize, the adaptive application recovery techniques described herein may be viewed as a closed-loop feedback mechanism to handle on-demand DR deployments without pre-provisioning resources and capacity in cloud or edge DCs and recovery from DR to active sites. The DR deployment may utilize a pre-provisioned application template. The DR deployment may be just-in-time, based on a feedback loop between an observer, an orchestrator, and a site (e.g., an SDN controller for a site). The feedback loop may allow the orchestrator to implement a policy that effects a relatively more efficient usage of computing resources, and may approach an optimal or maximum resource usage. Therefore, adaptive application recovery techniques may improve network performance while being relatively lightweight, featuring low computational cost and/or low bandwidth usage.

Figure 3:
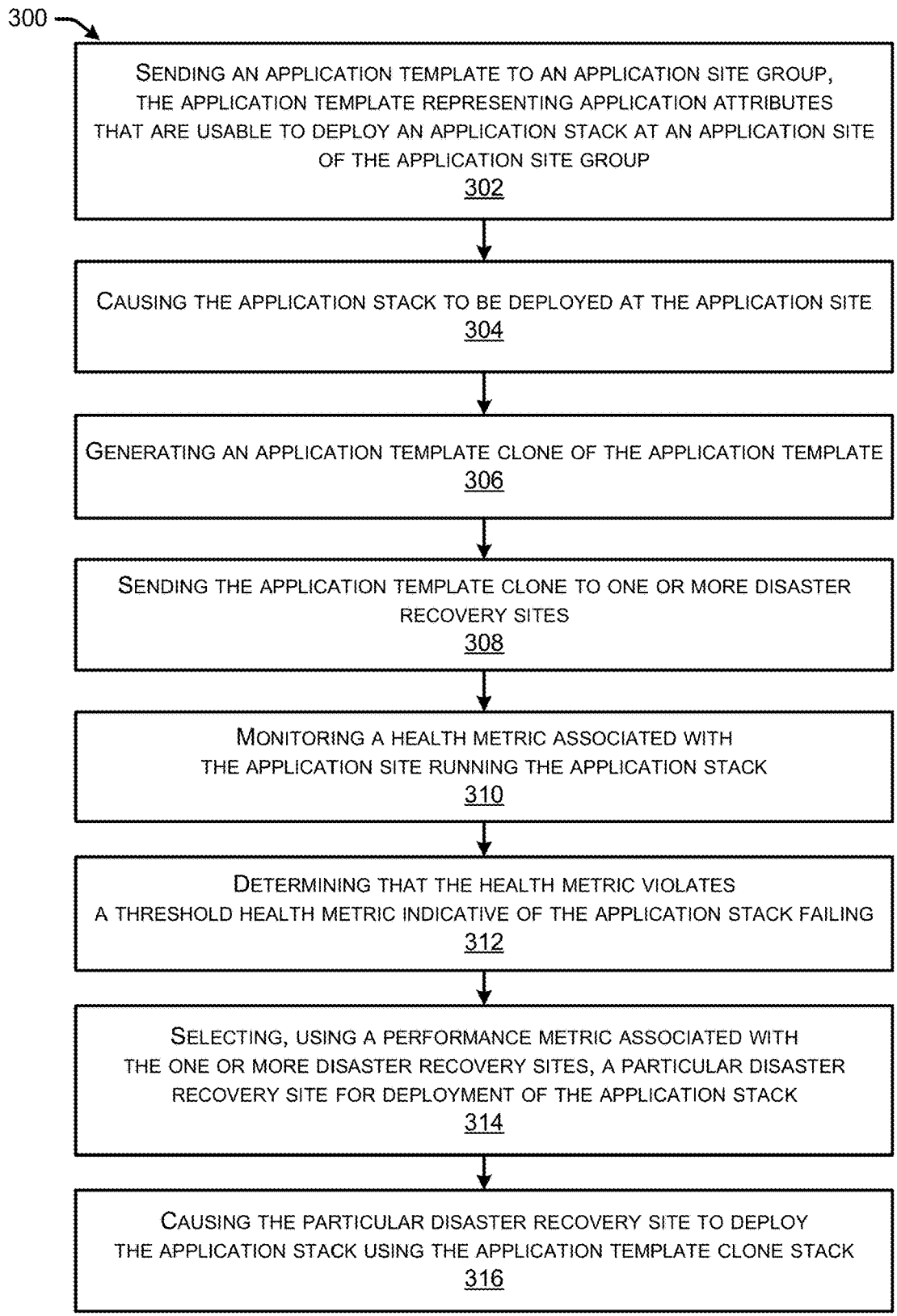
FIGS. 3 and 4 illustrate flow diagrams of example methods for adaptive application recovery as a part of communications among network devices, in accordance with the present concepts.
Figure 4:
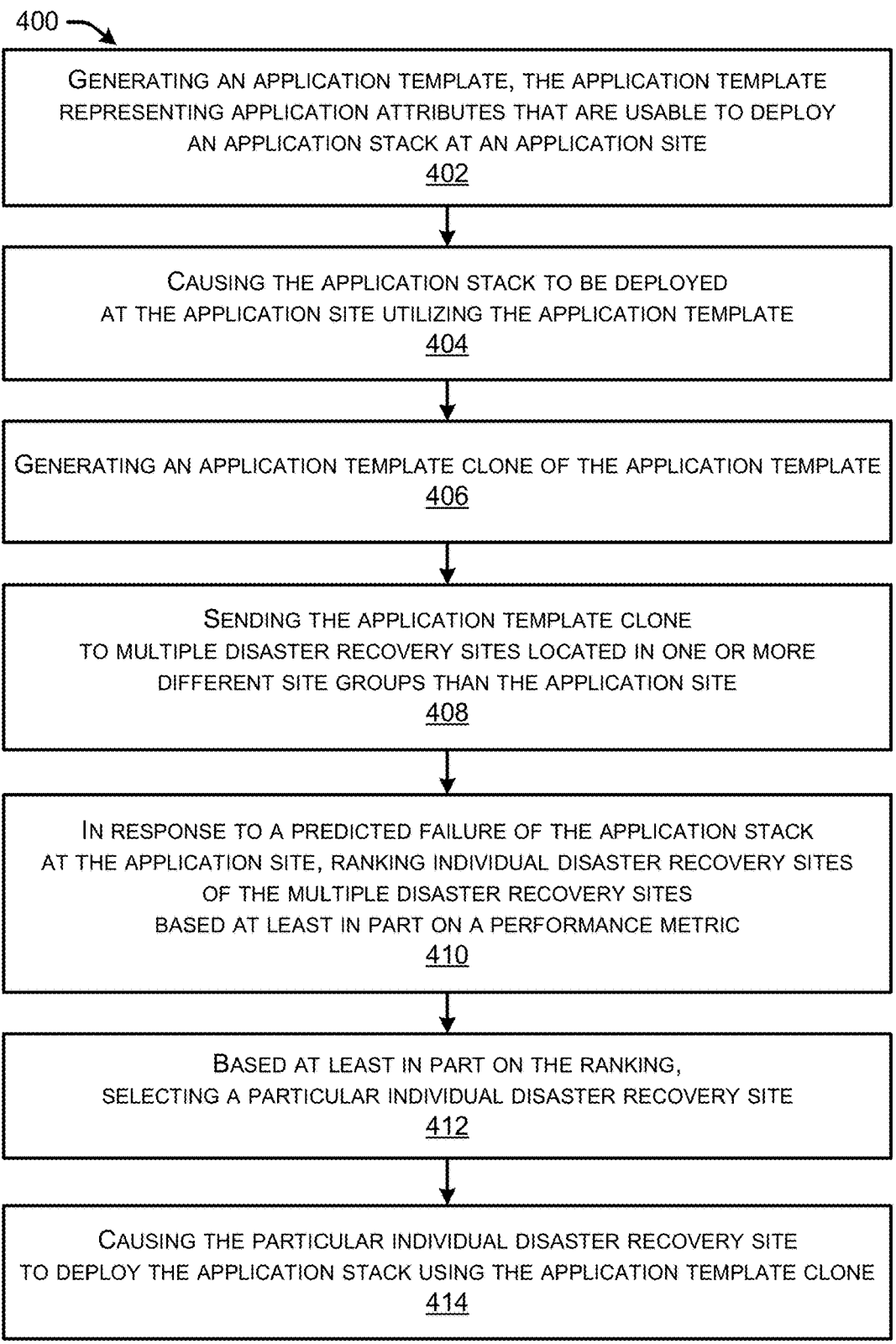

FIGS. 3 and 4 illustrate flow diagrams of example methods 300 and 400 that include functions that may be performed at least partly by a network device, such as orchestrator 116 and/or observer 118 described relative to FIGS. 1 and 2. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 3 and 4 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 3 illustrates a flow diagram of an example method 300 for network devices to perform adaptive application recovery techniques. Method 300 may be performed by one or more computing device(s) and/or a system representing orchestrator 116 and/or observer 118 communicatively coupled to one or more site groups (e.g., site groups 112), for instance. In some examples, method 300 may be performed by one or more computing devices, each potentially comprising one or more processors and one or more non-transitory computer-readable media storing computer-executable instructions that, when executed by the one or more processors, cause the one or more processors to perform method 300.

At 302, method 300 may include sending an application template to an application site group. In some examples, the application template may represent one or more application attributes that are usable to deploy an application stack. For instance, the application template may comprise application structure information, application data, network configuration information, and/or other attributes that are used to deploy the application stack.

At 304, method 300 may include causing the application stack to be deployed at an application site of the application site group. The application site group may contain multiple application sites, or simply a single, isolated application site. The application template may be particular to the application site group. For example, the application attributes of the application template may be tailored to, designed for, or otherwise particularly pertinent and/or relative to the application site group.

At 306, method 300 may include generating an application template clone of the application template. The application template clone may be a close or potentially exact copy of the application template, and may comprise similar or same application structure information, application data, network configuration information, and/or other attributes used to deploy the application stack.

At 308, method 300 may include sending the application template clone to one or more disaster recovery sites. In some examples, the application template clone may be received at the one or more disaster recovery sites but not yet provisioned or deployed. For instance, the application template clone may be stored in memory at any given disaster recovery site. The application template clone may not actively consume resources, but rather await deployment in a DR process, for example.

At 310, method 300 may include monitoring a health metric associated with the application site running the application stack. In some examples, the health metric may comprise a resource utilization value.

At 312, method 300 may include determining that the health metric violates a threshold health metric. Violation of the threshold health metric may be indicative of the application stack failing. The failure may be actually observed or may simply be predicted by the threshold health metric to occur in the relatively near future. The failure may represent any level of degradation of a service provided to a client device, for example. In some examples, the threshold health metric may comprise a predetermined resource utilization value, that when exceeded, indicates current or predicted degradation of service by the application stack.

At 314, method 300 may include selecting a particular disaster recovery site for deployment of the application stack. In some examples, the selection may be made using a performance metric associated with the one or more disaster recovery sites. The performance metric may comprise a resource utilization pattern, such as a resource utilization history of any of the one or more disaster recovery sites, for instance. Method 300 may further include ranking and/or comparing the one or more disaster recovery sites. The ranking or comparison may be based at least in part on the performance metric. In some examples, selecting the particular disaster recovery site may be based at least in part on the ranking of the one or more disaster recovery sites. For instance, the selected disaster recovery may have a history of relatively lower resource utilization compared to other disaster recovery sites in the comparison.

At 316, method 300 may include causing the particular disaster recovery site to deploy the application stack using the application template clone. For instance, upon initiation of a DR process, the application template clone may be provisioned to deploy the application stack. In some examples, the provisioning of the application template clone may be in response to the health metric violating the threshold health metric.

In some implementations, method 300 may further include continuing to monitor the health metric of the application site after the application stack is deployed at the particular disaster recovery site. Via the continued monitoring, a determination may be made that the health metric of the application site has returned to an acceptable level. Stated another way, the application site may have recovered and may be capable of effectively deploying the application stack again. In response to determining that the health metric has returned to an acceptable level, method 300 may include directing application traffic to the application stack at the application site. Once application traffic is successfully routed back to the application stack at the application site and service to a client is acceptable, method 300 may include undeploying the application stack at the particular disaster recovery site. Although the application stack at the particular disaster recovery site may be undeployed, in some examples the application template clone may remain at the particular disaster recovery site or site group, ready for a potential future DR instance to occur.

FIG. 4 illustrates a flow diagram of an example method 400 for network devices to perform adaptive application recovery techniques. Method 400 may be performed by one or more computing device(s) and/or a system representing orchestrator 116 and/or observer 118 communicatively coupled to one or more site groups (e.g., site groups 112), for instance. In some examples, method 400 may be performed by one or more computing devices, each potentially comprising one or more processors and one or more non-transitory computer-readable media storing computer-executable instructions that, when executed by the one or more processors, cause the one or more processors to perform method 400.

At 402, method 400 may include generating an application template. In some examples, the application template may represent application attributes that are usable to deploy an application stack at an application site.

At 404, method 400 may include causing the application stack to be deployed at the application site utilizing the application template. At this point the application may be viewed as actively running at the application site.

At 406, method 400 may include generating an application template clone of the application template. The application template clone may be the same as or similar to the application template. The application template clone may be generated for the purpose of preemptively staging at a disaster recovery site in case of a potential service degradation and/or other DR event or incident.

At 408, method 400 may include sending the application template clone to multiple disaster recovery sites. In some examples, the multiple disaster recovery sites may be located in one or more different site groups than the application site. The different site groups may simply represent different logical groupings of sites, or may refer to completely different geographic locations of sites or site groups.

At 410, method 400 may include ranking individual disaster recovery sites of the multiple disaster recovery sites. The ranking may be based at least in part on a performance metric, in some examples. The ranking may be in response to a predicted failure of the application stack at the application site, for instance. In some examples, the failure may have been predicted through monitoring a health metric of the application site. Thus, method 400 may include the monitoring of the health metric, monitoring of the health metric over time, comparison of the health metric to a threshold health metric, and/or predicting the failure.

In some implementations, method 400 may include determining an application tier for a disaster recovery process. Stated another way, method 400 may include determining a scope of the disaster recovery process. The application tier (or scope) may be determined based at least in part on the monitoring of the health metric, for instance. The application tier may simply comprise migration of the single application stack to a disaster recovery site. However, the scope may be broader, including DR for the application stack and at least one additional application stack running at the application site. In an even broader example that may represent a wider failure incident, the scope may include DR for the application stack and at least one additional application stack running at another application site within a site group that includes the application site.

At 412, based at least in part on the ranking, method 400 may include selecting a particular individual disaster recovery site. Finally, at 414, method 400 may include causing the particular individual disaster recovery site to deploy the application stack using the application template clone.

Figure 5:
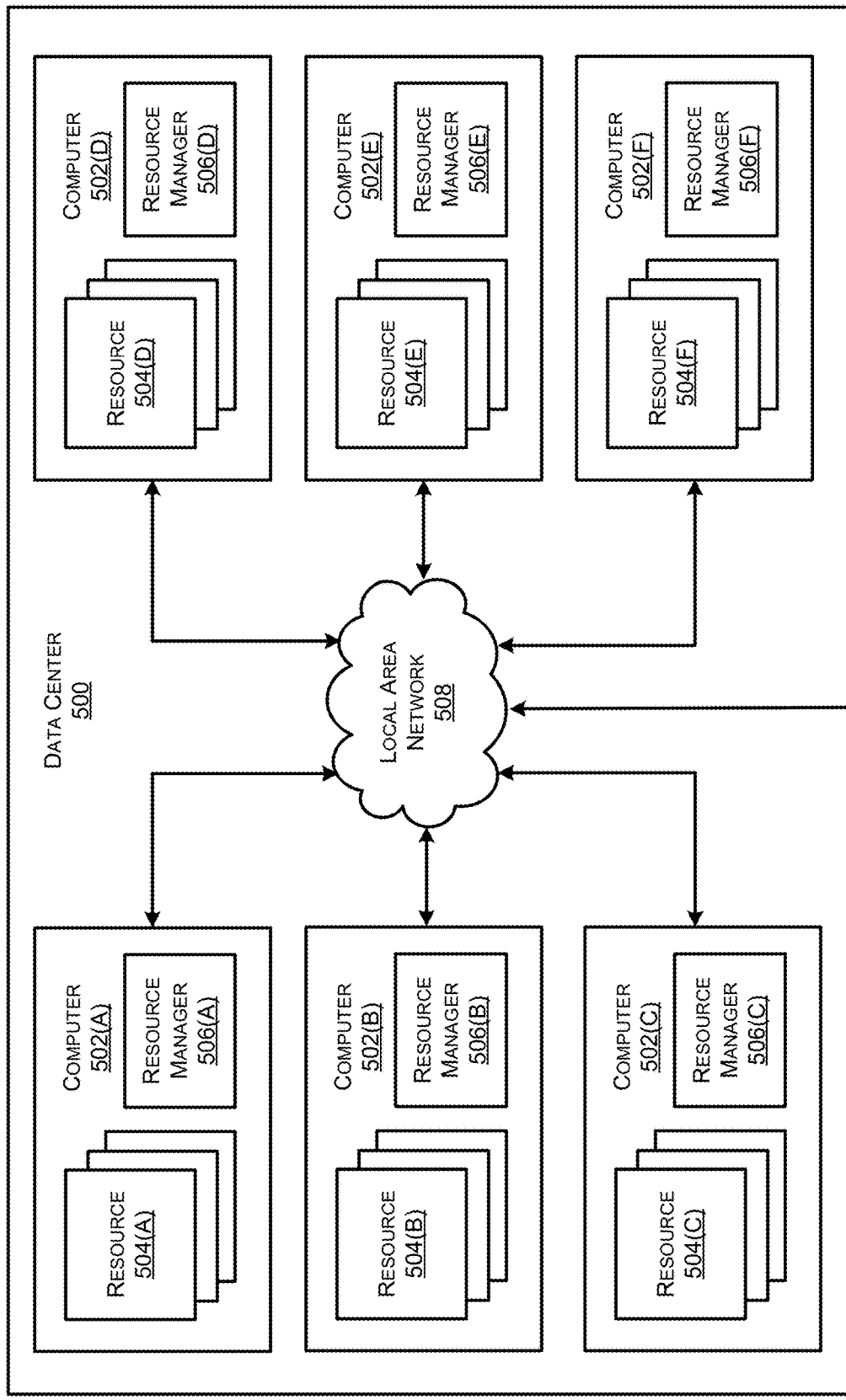
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several computers 502A-502F (which might be referred to herein singularly as "a computer 502" or in the plural as "the computers 502") for providing computing resources. In some examples, the resources and/or computers 502 may include, or correspond to, any type of networked device described herein, such as a sites 108, orchestrator 116, observer 118, and/or client device(s) 120. Although, computers 502 may comprise any type of networked device, such as servers, switches, routers, hubs, bridges, gateways, modems, repeaters, access points, hosts, etc.

The computers 502 can be standard tower, rack-mount, or blade server computers configured appropriately for providing computing resources. In some examples, the computers 502 may provide computing resources 504 including data processing resources such as virtual machine (VM) instances or hardware computing systems, database clusters, computing clusters, storage clusters, data storage resources, database resources, networking resources, and others. Some of the computers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single computer 502. Computers 502 in the data center 500 can also be configured to provide network services and other types of services.

In the example data center 500 shown in FIG. 5, an appropriate local area network (LAN) 508 is also utilized to interconnect the computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the computers 502A-502F in each data center 500, and, potentially, between computing resources in each of the computers 502. It should be appreciated that the configuration of the data center 500 described with reference to FIG. 5 is merely illustrative and that other implementations can be utilized.

In some examples, the computers 502 may each execute one or more application containers and/or virtual machines to perform techniques described herein. For instance, the containers and/or virtual machines may serve as server devices, user devices, and/or routers in the distributed application architecture 102 and/or network(s) 114.

In some instances, the data center 500 may provide computing resources, like application containers, VM instances, and storage, on a permanent or an as-needed basis.

Among other types of functionality, the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
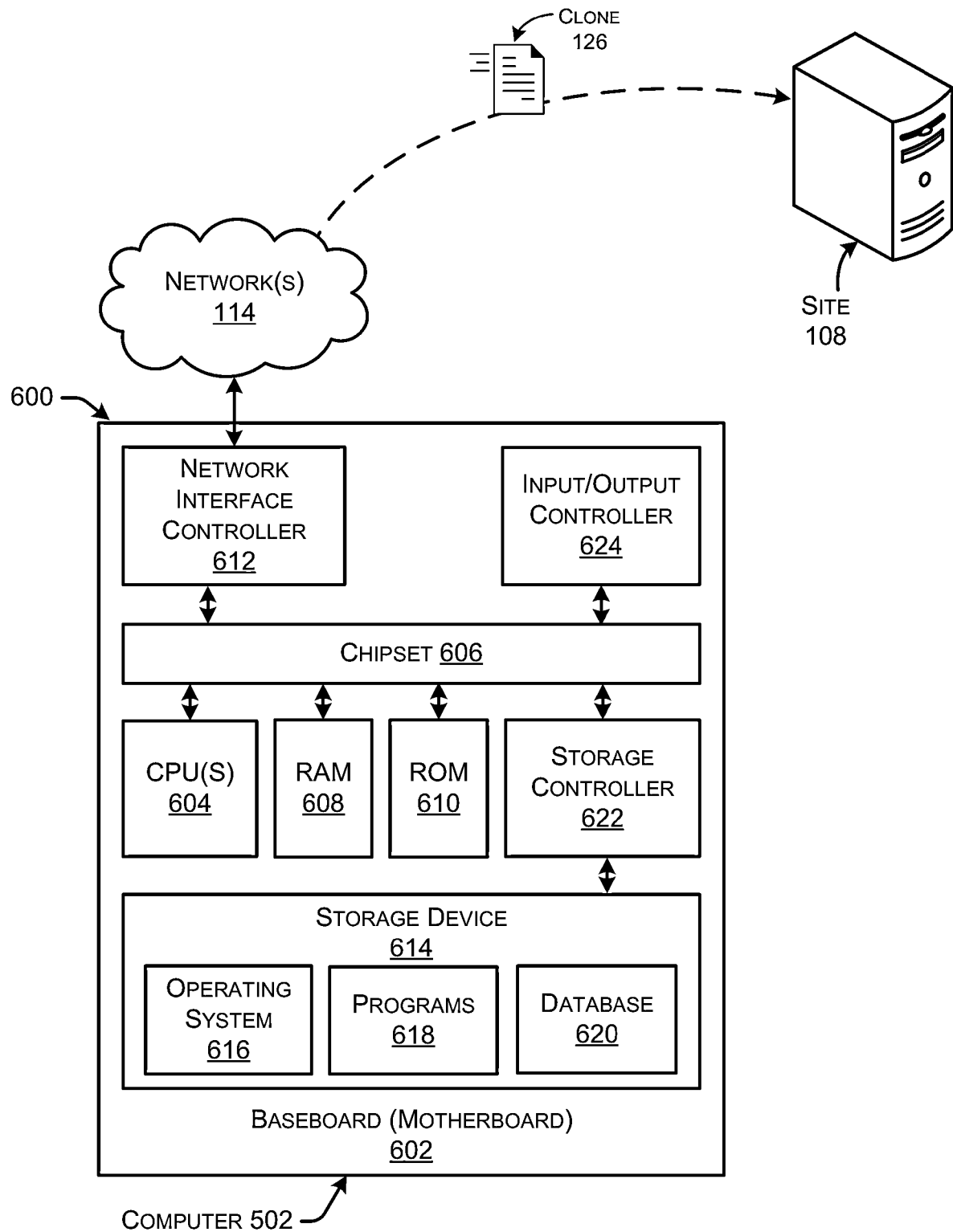
FIG. 6 is a computer architecture diagram showing an illustrative computer hardware architecture for implementing a device that can be utilized to implement aspects of the various technologies presented herein.

FIG. 6 shows an example computer architecture 600 for a computer 502 capable of executing program components for implementing the functionality described above. The computer architecture 600 shown in FIG. 6 illustrates a conventional server computer, workstation, desktop computer, laptop, tablet, network appliance, e-reader, smartphone, and/or other computing device, and can be utilized to execute any of the software components presented herein. The computer 502 may, in some examples, correspond to a physical device described herein (e.g., computing device, client device, router, SDN controller, etc.), and may comprise networked devices such as servers, switches, routers, hubs, bridges, gateways, modems, repeaters, access points, etc. For instance, computer 502 may correspond to orchestrator 116 and/or observer 118.

As shown in FIG. 6, the computer 502 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 502. The chipset 606 can further provide an interface to a computer-readable storage medium such as a read-only memory ("ROM") 610 or non-volatile RAM ("NVRAM") for storing basic routines that help to startup the computer 502 and to transfer information between the various components and devices. The ROM 610 or NVRAM can also store other software components necessary for the operation of the computer 502 in accordance with the configurations described herein.

The computer 502 can operate in a networked environment using logical connections to remote computing devices and computer systems through a network, such as the networks 114 and 508. The chipset 606 can include functionality for providing network connectivity through a network interface controller (NIC) 612, such as a gigabit Ethernet adapter. The NIC 612 is capable of connecting the computer 502 to other computing devices over the network 102. For instance, in the example shown in FIG. 6, NIC 612 may help facilitate transfer of data, packets, and/or communications, such as application template 122, application template 124, and/or application template clone 126 over the network 114 and/or via other computing devices to a site 108. It should be appreciated that multiple NICs 612 can be present in the computer 502, connecting the computer to other types of networks and remote computer systems.

The computer 502 can be connected to a storage device 614 that provides non-volatile storage for the computer. The storage device 614 can store an operating system 616, programs 618, a database 620, and/or other data. The storage device 614 can be connected to the computer 502 through a storage controller 622 connected to the chipset 606, for example. The storage device 614 can consist of one or more physical storage units. The storage controller 622 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 502 can store data on the storage device 614 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 614 is characterized as primary or secondary storage, and the like.

For example, the computer 502 can store information to the storage device 614 by issuing instructions through the storage controller 622 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 502 can further read information from the storage device 614 by detecting the physical states or characteristics of one or more particular locations within the physical storage units.

In addition to the mass storage device 614 described above, the computer 502 can have access to other computer-readable storage media to store and retrieve information, such as policies, program modules, data structures, templates, template clones, health metrics, performance metrics, and/or other data. It should be appreciated by those skilled in the art that computer-readable storage media is any available media that provides for the non-transitory storage of data and that can be accessed by the computer 502. In some examples, the operations performed by the network(s) 114, and or any components included therein, may be supported by one or more devices similar to computer 502. Stated otherwise, some or all of the operations performed by the network(s) 114, and or any components included therein, may be performed by one or more computer devices 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 614 can store an operating system 616 utilized to control the operation of the computer 502. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 614 can store other system or application programs and data utilized by the computer 502.

In one embodiment, the storage device 614 or other computer-readable storage media is encoded with computer-executable instructions which, when loaded into the computer 502, transform the computer from a general-purpose computing system into a special-purpose computer capable of implementing the embodiments described herein. These computer-executable instructions transform the computer 502 by specifying how the CPUs 604 transition between states, as described above. According to one embodiment, the computer 502 has access to computer-readable storage media storing computer-executable instructions which, when executed by the computer 502, perform the various processes described above with regards to FIGS. 1-4. The computer 502 can also include computer-readable storage media having instructions stored thereupon for performing any of the other computer-implemented operations described herein.

The computer 502 can also include one or more input/output controllers 624 for receiving and processing input from a number of input devices, such as a keyboard, a mouse, a touchpad, a touch screen, an electronic stylus, or other type of input device. Similarly, an input/output controller 624 can provide output to a display, such as a computer monitor, a flat-panel display, a digital projector, a printer, or other type of output device. It will be appreciated that the computer 502 might not include all of the components shown in FIG. 6, can include other components that are not explicitly shown in FIG. 6, or might utilize an architecture completely different than that shown in FIG. 6.

As described herein, the computer 502 may comprise one or more devices, such as sites 108, orchestrator 116, and/or observer 118, client device(s) 120, and/or other devices. The computer 502 may include one or more hardware processors 604 (processors) configured to execute one or more stored instructions. The processor(s) 604 may comprise one or more cores. Further, the computer 502 may include one or more network interfaces configured to provide communications between the computer 502 and other devices, such as the communications described herein as being performed by orchestrator 116 and/or observer 118, and/or other devices. In some examples, the communications may include data, packet, template, template clone, health metric, performance metric, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 618 may comprise any type of programs or processes to perform the techniques described in this disclosure in accordance with adaptive application recovery techniques. For instance, the programs 618 may cause the computer 502 to perform techniques for communicating with other devices using any type of protocol or standard usable for determining connectivity. Additionally, the programs 618 may comprise instructions that cause the computer 502 to perform the specific techniques described herein for adaptive application recovery and/or disaster recovery.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:
1. A computer-implemented method comprising:
  sending an application template to an application site group, the application template representing application attributes that are usable to deploy an application stack at an application site of the application site group;

causing the application stack to be deployed at the application site;
generating an application template clone of the application template;
sending the application template clone to one or more disaster recovery sites;
monitoring a health metric associated with the application site running the application stack;
determining that the health metric violates a threshold health metric indicative of the application stack failing;
selecting, using a performance metric associated with the one or more disaster recovery sites, a particular disaster recovery site for deployment of the application stack; and
causing the particular disaster recovery site to deploy the application stack using the application template clone.

2. The computer-implemented method of claim 1, wherein the application template and the application template clone comprise application structure information and application data that are used to deploy the application stack.

3. The computer-implemented method of claim 1, wherein the health metric comprises a resource utilization value and the threshold health metric comprises a predetermined resource utilization value.

4. The computer-implemented method of claim 1, further comprising:
storing the application template clone in memory at the particular disaster recovery site; and
provisioning the application template clone to deploy the application stack at the particular disaster recovery site in response to the health metric violating the threshold health metric.

5. The computer-implemented method of claim 1, wherein the performance metric comprises a resource utilization pattern.

6. The computer-implemented method of claim 5, further comprising:
ranking the one or more disaster recovery sites based at least in part on the resource utilization pattern; and
selecting the particular disaster recovery site based at least in part on the ranking.

7. The computer-implemented method of claim 1, further comprising:
continuing to monitor the health metric of the application site after the application stack is deployed at the particular disaster recovery site;
determining that the health metric of the application site has returned to an acceptable level; and
in response to determining that the health metric has returned to an acceptable level, directing application traffic to the application stack at the application site.

8. The computer-implemented method of claim 7, further comprising:
in response to directing application traffic to the application stack at the application site, undeploying the application stack at the particular disaster recovery site.

9. A disaster recovery system comprising:
one or more processors; and
one or more non-transitory computer-readable media storing computer-executable instructions that, when executed by the one or more processors, cause the one or more processors to:
send an application template to an application site group, the application template representing application attributes that are usable to deploy an application stack at an application site of the application site group;
cause the application stack to be deployed at the application site;
generate an application template clone of the application template;
send the application template clone to one or more disaster recovery sites;
monitor a health metric associated with the application site running the application stack;
determine that the health metric violates a threshold health metric indicative of the application stack failing;
select, using a performance metric associated with the one or more disaster recovery sites, a particular disaster recovery site for deployment of the application stack; and
cause the particular disaster recovery site to deploy the application stack using the application template clone.

10. The disaster recovery system of claim 9, wherein the application template and the application template clone comprise application structure information and application data that are used to deploy the application stack.

11. The disaster recovery system of claim 9, wherein the health metric comprises resource utilization and the threshold health metric comprises a predetermined resource utilization threshold value.

12. The disaster recovery system of claim 9, wherein the computer-executable instructions further cause the one or more processors to:
store the application template clone in memory at the particular disaster recovery site; and
provision the application template clone to deploy the application stack at the particular disaster recovery site in response to the health metric violating the threshold health metric.

13. The disaster recovery system of claim 9, wherein the performance metric comprises a resource utilization pattern.

14. The disaster recovery system of claim 13, wherein the computer-executable instructions further cause the one or more processors to:
rank the one or more disaster recovery sites based at least in part on the resource utilization pattern; and
select the particular disaster recovery site based at least in part on the ranking.

15. The disaster recovery system of claim 9, wherein the computer-executable instructions further cause the one or more processors to:
continuing to monitor the health metric of the application site after the application stack is deployed at the particular disaster recovery site;
determine that the health metric of the application site has returned to an acceptable level; and
in response to determining that the health metric has returned to an acceptable level, directing application traffic to the application stack at the application site.

16. The disaster recovery system of claim 15, wherein the computer-executable instructions further cause the one or more processors to:
in response to directing application traffic to the application stack at the application site, undeploy the application stack at the particular disaster recovery site.

17. A method comprising:
generating an application template, the application template representing application attributes that are usable to deploy an application stack at an application site;
causing the application stack to be deployed at the application site utilizing the application template;
generating an application template clone of the application template;

sending the application template clone to multiple disaster recovery sites located in one or more different site groups than the application site;
in response to a predicted failure of the application stack at the application site, ranking individual disaster recovery sites of the multiple disaster recovery sites based at least in part on a performance metric;
based at least in part on the ranking, selecting a particular individual disaster recovery site; and
causing the particular individual disaster recovery site to deploy the application stack using the application template clone.

18. The method of claim 17, further comprising:
monitoring a health metric of the application site; and
predicting the predicted failure of the application stack based at least in part on the monitoring of the health metric.

19. The method of claim 18, further comprising:
based at least in part on the monitoring of the health metric, determining an application tier for a disaster recovery process that includes causing the particular individual disaster recovery site to deploy the application stack using the application template clone.

20. The method of claim 19, wherein the application tier comprises one of:
the application stack;
the application stack and at least one additional application stack running at the application site; or
the application stack and at least one additional application stack running at another application site within a site group that includes the application site.

* * * * *